UNITED STATES PATENT OFFICE.

LEWIS U. BEAN, OF PHILADELPHIA, PENNSYLVANIA.

COMPOSITION OF MATTER FOR TEMPERING, TOUGHENING, AND IMPROVING THE QUALITIES OF STEEL AND OTHER METALS.

SPECIFICATION forming part of Letters Patent No. 373,430, dated November 22, 1887.

Application filed August 17, 1887. Serial No. 247,208. (No specimens.)

*To all whom it may concern:*

Be it known that I, LEWIS U. BEAN, a citizen of the United States, residing at 2030 Vine street, city of Philadelphia, and State of Pennsylvania, have invented a new and useful composition of matter to be used for the purpose of tempering, toughening, and improving the quality of steel and restoring burned steel and improving other metals, of which the following is a specification.

My composition consists of the following ingredients, combined in the proportions stated, viz: one (1) gallon cotton-seed oil; four (4) pounds tallow; twenty (20) pounds rosin; one (1) gallon tar, and two (2) pounds burned bone. These ingredients are to be thoroughly incorporated by heat.

In using this compound the tools, steel, or metal are to be brought to a high heat and immersed in it until somewhat "cooled." In the case of tools they may be reheated and tempered, in the usual way, in water, or tempered altogether in the compound.

It will greatly improve the metals by toughening and hardening them and making the materials of a finer grain, and especially steel tools will have greater power over material to be worked upon by them, and will require less dressing and sharpening than tools tempered, in the usual way, by water alone.

What I claim, and desire to secure by Letters Patent of the United States, is—

The herein-described composition of matter to be used to temper, toughen, and improve the qualities of steel and other metals, consisting of cotton-seed oil, tallow, rosin, tar, and burned bone, in the proportions specified.

LEWIS U. BEAN.

Witnesses:
ERASTUS POULSON,
GEO. W. BYE.